United States Patent [19]

Bertani et al.

[11] 4,375,200

[45] Mar. 1, 1983

[54] ANTITHEFT DEVICE

[76] Inventors: Gilbert A. Bertani, 6000 Bissonnet #275, Houston, Tex. 77081; Mary L. Vandiver, 1055 Fondren #222, Houston, Tex. 77063

[21] Appl. No.: 208,926

[22] Filed: Nov. 21, 1980

[51] Int. Cl.³ .................. B60R 25/00; E05B 45/00; E05B 65/12

[52] U.S. Cl. .......................... 116/8; 70/259; 116/33; 137/38; 152/415; 180/287

[58] Field of Search ............ 152/415, 330 R; 70/237, 70/259, 260; 137/38, 230, 383; 180/287; 116/33, 34 R, 75, 8

[56] References Cited

U.S. PATENT DOCUMENTS

| | | | |
|---|---|---|---|
| 2,470,873 | 5/1949 | Seitz | 152/415 |
| 2,737,223 | 3/1956 | Plath | 152/415 |
| 3,003,539 | 10/1961 | Tone | 152/415 |
| 3,532,140 | 10/1970 | Hoffman | 152/415 X |
| 3,838,717 | 10/1974 | Wolf | 152/415 X |
| 3,910,221 | 10/1975 | Aske et al. | 116/33 |

*Primary Examiner*—John E. Kittle
*Assistant Examiner*—Thomas Bokan
*Attorney, Agent, or Firm*—Bill B. Berryhill

[57] ABSTRACT

An antitheft device adapted for attachment to the valve stem of an inflated vehicle tire may comprise: a plunger assembly including a plunger engageable with a valve core of the valve stem and axially movable relative thereto for forcing the valve core to an open position releasing air from the tire; and an actuator assembly including a cam member radially movable with respect to the axis of the plunger in response to rotation of the vehicle tire, from a passive position to an active position forcing the plunger toward opening of the valve core.

13 Claims, 5 Drawing Figures

ANTITHEFT DEVICE

BACKGROUND OF THE INVENTION

1. Field of the Invention

The present invention pertains to devices for deflating vehicle tires in response to movement of the vehicle. More particularly, the present invention pertains to an antitheft device which automatically releases air from the tires of a vehicle when the vehicle is stolen or driven by an unauthorized operator.

2. Description of the Prior Art

Due to the increasing number of auto thefts, a number of antitheft devices have been developed. Many of these devices attempt to provide some foolproof method of locking the doors of the vehicle or of preventing ignition of the enging. However, most of these devices are fairly easily overcome, particularly to the sophisticated auto thief.

In U.S. Pat. No. 3,003,539, a device is disclosed which may be locked on the tire of a vehicle and is specifically designed to deflate the tire in case the vehicle is stolen. The deflating mechanism includes a plunger having a spring which biases the plunger toward engagement with the tire valve. The mechanism is set by disposing a portion of a pivoted lever between the deflating plunger and the tire valve. A weight is attached to the end of the lever. If the weight is not locked in place and the automobile begins to move, centrifugal force will cause the weight to pivot the lever out of engagement with the end of the tire-deflating plunger, allowing it to engage the tire valve and releasing air from the tire. While this device appears to be workable, it is relatively bulky and the lever which actuates the device is subject to tampering. For these and possibly other reasons, this device has not found commercial acceptance.

There are other devices in the prior art for releasing air from vehicle tires. However, most of these do not appear to be concerned with theft of the vehicle. For example, U.S. Pat. Nos. 3,532,140 and 3,838,717 disclose relatively complicated devices used to simulate tire blowouts for testing of vehicles. These are devices which operate on pressure and have mechanisms to quickly release air from a tire to simulate a blowout.

U.S. Pat. Nos. 2,470,873 and 2,737,223 disclose apparatus which allows an airplane tire to be inflated to a relatively high take-off pressure but after take-off, releases some of the air so that upon landing, the tire will not be as likely to blow out. In neither one of these devices is all the air allowed to completely escape the tire.

SUMMARY OF THE INVENTION

In the present invention, an antitheft device is disclosed for releasing air from the vehicle tire resulting in flattening of the tire so that the vehicle cannot be driven with safety or at great speed. Upon such occurrence, the would-be thief would very likely abandon the vehicle within a short distance. Damage to the vehicle and other property would thereby be materially reduced and recovery of the vehicle made more likely.

The antitheft device of the present invention includes a plunger assembly adapted for attachment to the valve stem of a vehicle tire and including a plunger engageable with the valve core of the valve stem, axially movable relative thereto from a first position not interfering with the closure of the valve core and a second position forcing the valve core to open, releasing air from the tire. The device also includes an actuator assembly carried within a housing and including a cam member, radially movable with respect to the axis of the plunger in response to rotation of the vehicle tire, from a passive position to an active position forcing the plunger and valve core to an open position.

The device is relatively simple, inexpensive, easy to install and tamper-proof. It is extremely effective in operation and in preventing damage to and loss of the vehicle to which the device is attached. Other objects and advantages of the invention will be apparent from reading the description which follows in conjunction with the accompanying drawings.

DESCRIPTION OF A PREFERRED EMBODIMENT

Figure 1:
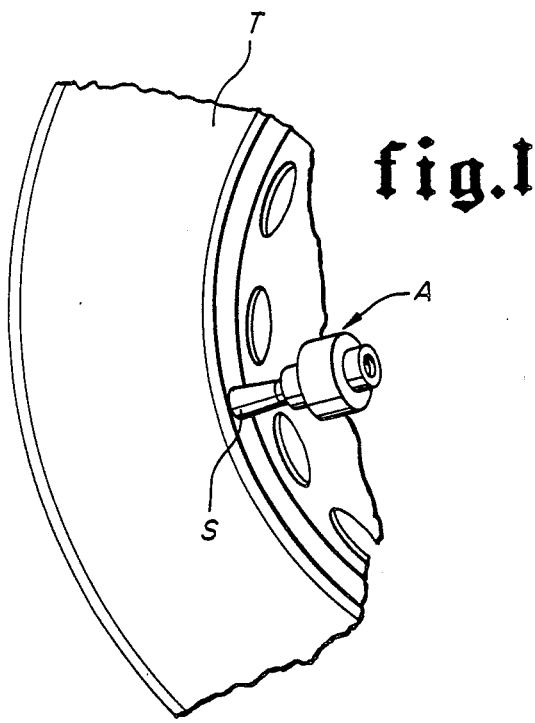
FIG. 1 is a partial elevation view of a vehicle tire showing an antitheft device, according to a preferred embodiment of the invention, attached thereto.

Referring first to FIG. 1, the antitheft device A of the present invention is shown attached to the valve stem S of a vehicle tire T. As is well known, the valve stem S may be provided with a valve core V by which the tire T may be inflated or deflated.

Figure 2:
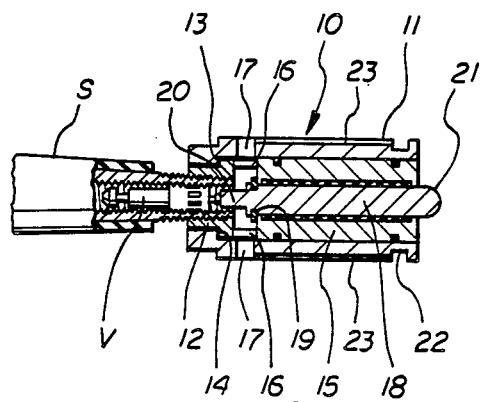
FIG. 2 is a longitudinal view, in section, of the plunger assembly of an antitheft device, according to a preferred embodiment of the invention.

The antitheft device A comprises a plunger assembly 10 best illustrated in FIG. 2. The plunger assembly may comprise a tubular member 11 in which is carried a threaded member 12 for threaded engagement with the valve stem S. The member 12 is rotatable within the tubular member 11 but, due to engagement of corresponding annular shoulders 13 and 14 on the member 12 and tubular member 11, respectively, and the presence of bushing 15, is not removable therefrom. The threaded member 12 is provided with peripheral lugs 16 which may be engaged through holes 17 provided in the tubular member 11. In fact, the threaded member 12 is tightly engaged with the valve stem S by engaging the lugs 16 with a screwdriver or other tool projected through hole 17. Once the threaded member 12 is tightly engaged with the stem S, the plunger assembly 10 can only be removed by reengaging the lugs 16 through holes 17.

The bushing 15 is sized for tight interference fit with the tubular member 11 and has a central bore therethrough in which is disposed a plunger 18. The plunger 18 is retained in the assembly 10 for limited axial movement by a snap ring 19 which is received in a groove provided therefor. The end of the plunger 18 nearest to the valve stem S is provided with an extension 20 for engagement with the valve core V. However, due to the spring biasing of the valve core V, the extension 20 and plunger 18 are biased toward a first terminal position, illustrated in FIG. 2, in which the plunger 18 does not materially interfere with the closing of the valve core V. The opposite end of the plunger 18 is provided with a spherical or rounded head 21 which projects out of the bushing 15 and tubular member 11 for engagement by an actuator assembly, as will be more fully understood hereafter. It will be noted that the tubular member 11 is provided with an annular groove 22 in the end most removed from the valve stem S.

Figure 3:
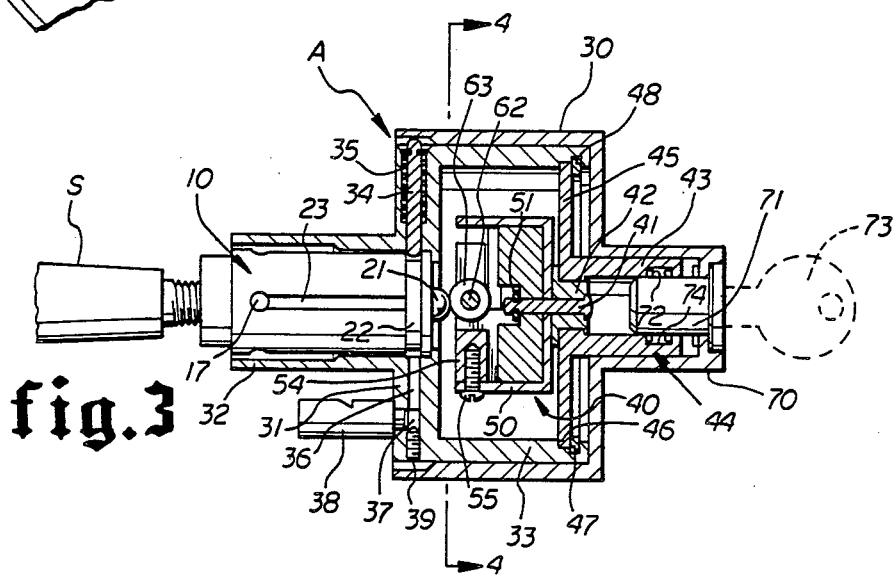
FIG. 3 is a longitudinal view of the plunger assembly in FIG. 2 and the remainder of the antitheft device, partially in section, according to a preferred embodiment of the invention.

After the plunger assembly 10 is firmly attached to the valve stem S, the remainder of the antitheft device A is installed, as shown in FIG. 3. The device includes a housing of two parts 30 and 31. The inner housing 31 includes a small cylindrical portion 32 and a larger cylindrical portion 33 open at opposing ends thereof. Carried by the inner housing 31, in a radial hole provided therefor, is a latch pin 34 which is biased radially outward by spring 35 but when properly engaged by outer housing 30 is forced radially inward for engagement with groove 22 of the plunger assembly 10. In this position, the inner and outer housing 30 and 31 are latched to the plunger assembly 10, but since there is a sliding fit between cylindrical section 32 and the plunger assembly 10, the housing members are rotatable relative to the plunger assembly 10. It will also be noted that the cylindrical section 32 almost completely surrounds the plunger assembly 10 and covers the holes 17 therein to prevent disengagement of the plunger assembly 10 from the valve stem S.

Carried within the larger cylindrical section 33 of the inner housing 31 is an actuator assembly 40. The actuator assembly 40 is mounted for rotation about a pin 41 projecting from a bearing member 42. The bearing member 42 is in turn supported within a cylindrical extension 43 of a locking member 44 having a radial extension 45. The periphery of the radial extension 45 rests against an annular shoulder 46 of of the inner housing 31 and is held in place by a snap ring 47 which engages a groove 48 provided in the cylindrical section 33. Thus, the locking member 44 serves as a mounting for the actuator assembly 40 as well as providing a means of locking the components of the device together as will be more fully understood hereafter.

Figure 4:
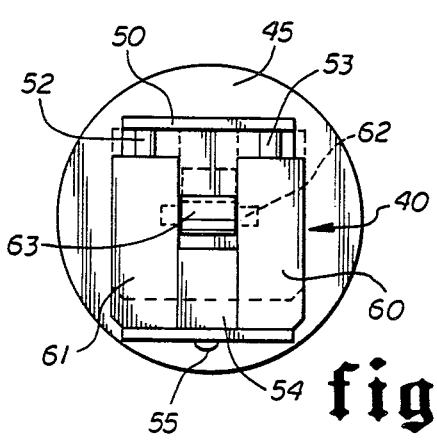
FIG. 4 is a cross-sectional view of the antitheft device of the present invention, taken along lines 4—4 of FIG. 3, and showing in greater detail the actuating assembly thereof.
Figure 5:
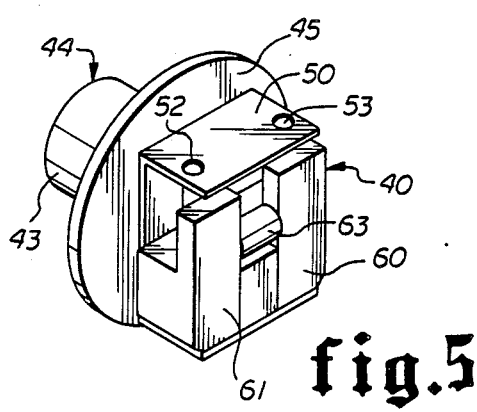
FIG. 5 is a perspective view of the actuating assembly of the antitheft device of the present invention.

Referring also to FIGS. 4 and 5, the actuator assembly 40 will be described in greater detail. The actuator assembly 40 may include a weight carrier member 50 which is rotatingly mounted on the pin 41 and held in place thereon by a snap ring 51. The weight carrier member shown is a channel-shaped member from the sides of which are supported parallel guide members 52 and 53. If required, a stationary weight 54 may also be attached to the carrier member 50 by a fastener 55. Mounted on the carrier member 50 is a weight member which in the illustrated embodiment comprises a pair of weights 60 and 61 having holes therethrough for receiving guide members 52 and 53. Thus, the weight members 60 and 61 are mounted for limited movement between the sides of the channel-shaped member 50.

Supported at opposite ends by the weights 60 and 61 is a cam shaft 62 on which is mounted a cam roller 63. Thus, the cam roller 63 moves transversely with respect to the axis of the antitheft device A in response to the movement of weights 60 and 61. When completely assembled, the cam roller 63 lightly engages the rounded end 21 of the plunger 18. However, when the vehicle to which the antitheft device is attached is not in motion, the weights 60 and 61 are not sufficient to cause the cam follower 63 to force the plunger 18 downwardly against the spring biasing of the valve core V.

It will be noted that the weight members 60 and 61 are unbalanced so that the heavier portions thereof are always on the side of the axis of the device opposite the cam member 63. Thus, there is a normal gravity tendency for the weight members 60 and 61 to move the cam 63 against the plunger 18. However, as previously mentioned, the weight of the weight members 60 and 61 are not sufficient of themselves to overcome the bias against the plunger 18. However, if the vehicle to which the antitheft device A is attached is placed in motion, centrifugal force acting on the weight members 60 and 61 causes enough force to move the cam member 63 against the rounded end 21 of the plunger 18 forcing it axially from the first terminal position illustrated in FIG. 2 to the second terminal position (as shown in FIG. 3) forcing the valve core V to an open position releasing air from the tire. These weights are preferably designed so that a speed of over ten or twenty miles per hour creates the necessary force to release air from the vehicle tire T.

As previously mentioned, the outer housing 30 surrounds the inner housing 31 holding the latch pin 34 in place and locking all components together. If the outer housing 30 is removed, or moved axially a sufficient distance to allow retraction of the latch pin 34, all components of the device A may be removed from the plunger assembly 10. To prevent such removal, the outer housing 30 is provided with a cylindrical locking extension 70 which surrounds the cylindrical extension 43 of the locking member 44. Mounted in the extension 70 is a conventional lock cylinder 71. The lock cylinder 71 is provided with at least one lock tumbler 72 which upon removal of the key 73 is caused to engage a corresponding groove 74 within the lock member 44. This locks the outer housing 30 in the position shown in FIG. 3 preventing tampering with any of the components which would release the antitheft device A from the valve stem S. However, if the key 73 is inserted, the lock tumbler 72 is withdrawn allowing the components to be separated and allowing the antitheft device A to be removed if desired.

Thus, as described, the antitheft device A of the present invention comprises a plunger assembly 10 which includes a plunger 18 engageable with the valve core V of valve stem S and axially movable relative thereto between a first terminal position (as shown in FIG. 2) not interfering with the closure of the valve core V and a second terminal position (as shown in FIG. 3) forcing the valve core V to an open position and releasing air from the tire T. The actuator assembly 40 carried within the housing member 30 and 31 includes a cam member 63 which is radially movable with respect to the axis of the plunger 18 in response to rotation of the vehicle tire T, from a passive position to an active position (as in FIG. 3) forcing the plunger 18 toward its second terminal position, releasing air from the tire T. The components of the device A, when assembled, and when locked, are not subject to tampering or removal of the device from the valve stem S. Only by insertion of the key 73 and the lock 71 may these parts be removed.

Thus, the antitheft device of the present invention is simple to install and is tamperproof. It is extremely effective in operation, causing air to be released from vehicle tires when the vehicle is driven by an unauthorized operator. Although a preferred embodiment of the invention has been described herein, variations can be made without departing from the spirit of the invention. For example, the device may be provided with an air passage through plunger assembly 10 (such as longitudinal channels 23 in FIGS. 2 and 3), radial port 36, and cavity 37, for communication with a whistle structure 38, carried by one of the housing components 30 or 31 for producing an audible signal upon release of air from the tire T. Accordingly, it is intended that the scope of the invention be limited only by the claims which follow.

We claim:

1. An antitheft device adapted for attachment to the valve stem of an inflated vehicle tire comprising:
    housing means;
    plunger means including a plunger engageable with the valve core of said valve stem and axially movable relative thereto between a first terminal position not interfering with the closure of said valve core and a second terminal position forcing said valve core to an open position releasing air from said tire; and
    actuator means carried within said housing means including a cam member, radially movable with respect to the longitudinal axis of said plunger, in response to rotation of said vehicle tire, from a passive position to an active position forcing said plunger toward said second terminal position.

2. An antitheft device as set forth in claim 1 in which said actuator means comprises a weight carrier member mounted in said housing means for rotation about said longitudinal axis and a weight member carried on said carrier member for limited movement perpendicular to said longitudinal axis, said cam member being attached to said weight member for said radial movement thereof.

3. An antitheft device as set forth in claim 2 in which said weight member is unbalanced so that the heavier portion thereof is always on the side of said longitudinal axis opposite said cam member.

4. An antitheft device as set forth in claim 1 in which said plunger means comprises a tubular member in which said plunger is carried and in which is carried a threaded member for threaded attachment of said antitheft device to said valve stem, said threaded member being accessible through at least one aperture on said tubular member for tightening said threaded attachment of said antitheft device to said valve stem.

5. An antitheft device as set forth in claim 4 in which said housing means is engageable with said tubular member in such a manner that a portion thereof covers said aperture preventing removal of said antitheft device from said valve stem.

6. An antitheft device as set forth in claim 4 in which said housing means comprises: an inner housing attachable to said tubular member having a first portion surrounding said tubular member and a second portion surrounding said actuator means; and an outer housing surrounding at least said second portion of said inner housing.

7. An antitheft device as set forth in claim 6 including locking means locking said inner and outer housings together and preventing unwanted removal of said antitheft device from said tire stem.

8. An antitheft device as set forth in claim 7 in which said inner housing and said tubular member are provided with cooperating latch means by which they are attached, said latch means being disengageable when said outer housing is surrounding said inner housing.

9. An antitheft device as set forth in claim 1 including an air passage in said plunger assembly providing air communication between said valve stem and whistle means carried by said housing means for producing an audible signal in response to said releasing of air from said tire.

10. An antitheft device adapted for attachment to the valve stem of an air-inflated vehicle tire comprising:
    a plunger assembly threadedly connected to said valve stem and including a plunger engageable with the valve core of said valve stem axially movable relative thereto from a first position not interfering with the closure of said valve core to a second position forcing said valve core to an open position releasing air from said tire;
    an actuator assembly including a cam member mounted for radial movement with respect to the longitudinal axis of said plunger member and movable in response to rotation of said vehicle tire from a passive position to an active position engaging and forcing said plunger to said second position;
    a housing assembly for surrounding said plunger assembly and said actuator assembly preventing access thereto; and
    a locking assembly selectively locking said housing assembly around said plunger and actuator assemblies.

11. An antitheft device as set forth in claim 10 in which said actuator assembly includes a weight member to which said cam member is attached, said weight member being movable radially with respect to said longitudinal axis and unbalanced relative thereto so that upon said rotation of said vehicle tire the heavier side of said weight member moves radially away from said plunger axis effecting said radial movement of said cam member to said active position.

12. An antitheft device as set forth in claim 11 in which said actuator assembly is rotatable about an axis coinciding with the longitudinal axis of said plunger member allowing said weight member to move radially away from said axis in response to centrifugal force created by the movement of said vehicle tire.

13. An antitheft device as set forth in claim 10 including an air passage in said plunger assembly providing air communication between said valve stem and whistle means carried by said housing means for producing an audible signal in response to said releasing of air from said tire.

* * * * *